(12) United States Patent
Barton et al.

(10) Patent No.: US 6,514,045 B1
(45) Date of Patent: Feb. 4, 2003

(54) ROTOR SEAL

(75) Inventors: John P Barton, Derby (GB); Dale E Evans, Derby (GB)

(73) Assignee: Rolls-Royce Plc, London (GB)

( * ) Notice: Subject to any disclaimer, the term of this patent is extended or adjusted under 35 U.S.C. 154(b) by 139 days.

(21) Appl. No.: 09/611,223

(22) Filed: Jul. 6, 2000

(30) Foreign Application Priority Data

Jul. 6, 1999 (GB) ............................................... 9915637

(51) Int. Cl.$^7$ ................................................ F01D 5/22
(52) U.S. Cl. ..................... 416/193 A; 416/230; 416/248
(58) Field of Search ................... 416/190, 191, 416/193 A, 193 R, 230, 229 A, 241 A, 248

(56) References Cited

U.S. PATENT DOCUMENTS

| | | | | |
|---|---|---|---|---|
| 3,771,922 A | * | 11/1973 | Tracy | 416/190 |
| 4,045,149 A | * | 8/1977 | Ravenhall | 416/193 A X |
| 4,494,909 A | | 1/1985 | Forestier | 416/190 |
| 4,580,946 A | * | 4/1986 | Bobo | 416/193 A X |
| 5,464,326 A | * | 11/1995 | Knott | 416/193 A |
| 5,599,170 A | * | 2/1997 | Marchi et al. | 416/193 A X |
| 5,890,874 A | * | 4/1999 | Lambert et al. | 416/193 A |
| 6,217,283 B1 | * | 4/2001 | Ravenhall et al. | 416/193 A X |
| 6,312,224 B1 | * | 11/2001 | Knott et al. | 416/229 A |

FOREIGN PATENT DOCUMENTS

| | | |
|---|---|---|
| EP | 0 787 890 | 8/1997 |
| WO | WO 93/22539 | 11/1993 |

* cited by examiner

*Primary Examiner*—Edward K. Look
*Assistant Examiner*—Richard A. Edgar
(74) *Attorney, Agent, or Firm*—Pillsbury Winthrop LLP

(57) ABSTRACT

A seal (30) is provided for reducing the gap between alternate wall members (20) and adjacent blades (14) that are arranged circumferentially in a rotor (12). The seal (30) has a flange portion (36), which is inclined radially inward. The flange portion (36) of the seal (30) is in the form of rubber bellows (32) which have a cavity (34) therein. In operation the flange portion (36) of the seal (30) is deflected radially outwards by centrifugal forces acting thereon. The seal (30) is open at one end to allow air compressed by the rotor (12) to pass into the cavity (34) and inflate the seal (30). Inflation of the seal (30) ensures that the gap between the edge (26) of the wall member (20) and the blade (14) is filled. A good seal is thus maintained throughout operation of the rotor (12) and prevents the air in void (28) passing into the blade passage.

34 Claims, 3 Drawing Sheets

ROTOR SEAL

The present invention relates to seals and in particular to seals interposed between the platforms of blades in a rotor.

A conventional fan rotor for compressing air comprises a disc having a plurality of radially extending blades mounted thereon. The fan blades are mounted on the disc by inserting the radially inner end of the blades in correspondingly shaped retention grooves in the radially outer face of the disc. The fan blades do not have platforms so separate wall members bridge the space between pairs of adjacent blades to define the inner annulus wall for the compressed air. Each wall member is separated from the adjacent blades by a small gap, which accommodate manufacturing tolerances and changes to the blade shape during operation of rotor.

A void exists between the wall members and the radially outer face of the disc. This void is full of air, which is at a higher static pressure than the air in the blade passages. Seals are therefore used to bridge the gap between the wall members and the blades to prevent air flow from the void into the blade passage.

It is known to use seals made from resilient materials, which are bonded to the edges of the wall members adjacent the blades to seal the gap therebetween. The seals are designed to be urged radially outward into engagement with the blades as the rotor rotates.

One such seal is disclosed in EP-0640172 which is owned by the applicant. In the arrangement described the resilient seal strip has an undulating flange portion which is inclined radially inward. In operation the flange portion is deflected radially outwards by centrifugal forces as the rotor rotates and engages with the adjacent fan blades to seal between the wall members and the adjacent blades. The undulations are substantially sinusoidal and enhance the flexibility of the seal member. The undulations however create smaller voids in which air re-circulates to disrupt the airflow in the blade passage.

The present invention seeks to provide an improved seal in which seal voids are minimised to avoid re-circulation and so improve the aerodynamic performance of the seal.

According to the present invention there is provided a seal for reducing the gap between adjacent members which are arranged circumferentially in a rotor, the seal has a flange portion which is inclined radially inwards, a cavity is located in the flange portion of the seal whereby in operation the flange position is deflected radially outwards and the cavity fills with a fluid to inflate the seal.

Preferably the cavity has at least one opening which is in communication with a fluid which in operation passes through the rotor. The fluid which passes into the cavity to inflate the seal is preferably air.

In the preferred embodiments of the present invention the seal consists of a bellows which define the cavity. The bellows may be formed from a resilient material such as rubber.

Preferably the rubber is reinforced. The rubber may be reinforced by at least one carbon composite member. The carbon composite may be either a single strip having slots therein, to render it sufficiently flexible to accommodate the curvature of the adjacent blades, or a plurality of discrete carbon composite panels.

In addition to the carbon composite the seal may be further reinforced with a fabric such as polyester. The fabric reinforcement may extend around the carbon composite member.

The present invention will now be described by way of example and with reference to the following figures in which.

Figure 1:
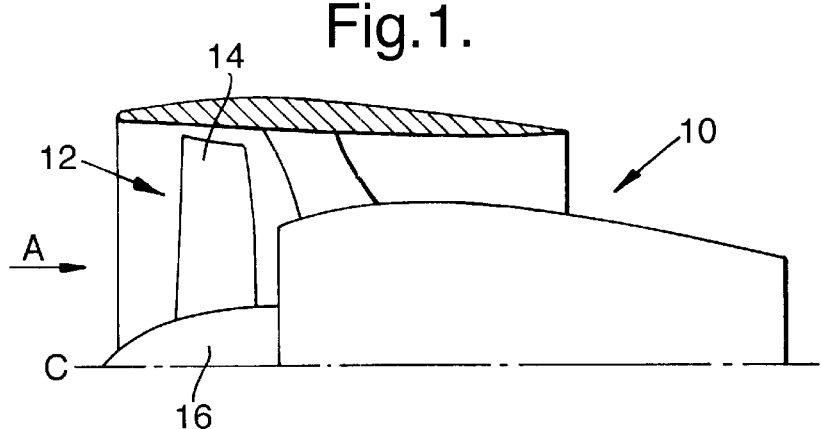
FIG. 1 is a diagrammatic view of a gas turbine engine incorporating a rotor seal in accordance with the present invention.

Referring to FIG. 1 a gas turbine engine 10, which operates in conventional manner has a fan rotor 12 arranged at its upstream end.

Figure 2:
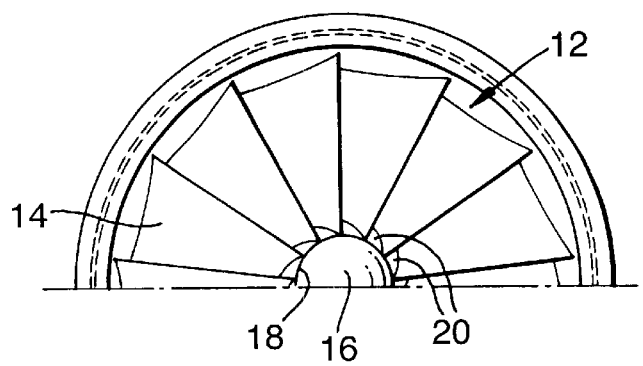
FIG. 2 is a view of a rotor incorporating a rotor seal in the direction of arrow A in FIG. 1.

The fan rotor 12 consists of a number of fan blades 14, which are mounted on a radially outer face 18, FIG. 2, of a disc 16. The fan blades are curved in an axially extending direction. The fan blades 14 do not have platforms and wall members 20 bridge the spaces between adjacent pairs of blades 14. The wall members 20 are fastened to the radially outer face 18 of the disc 16 and define the inner wall of a flow annulus for air compressed by the fan.

Figure 3:
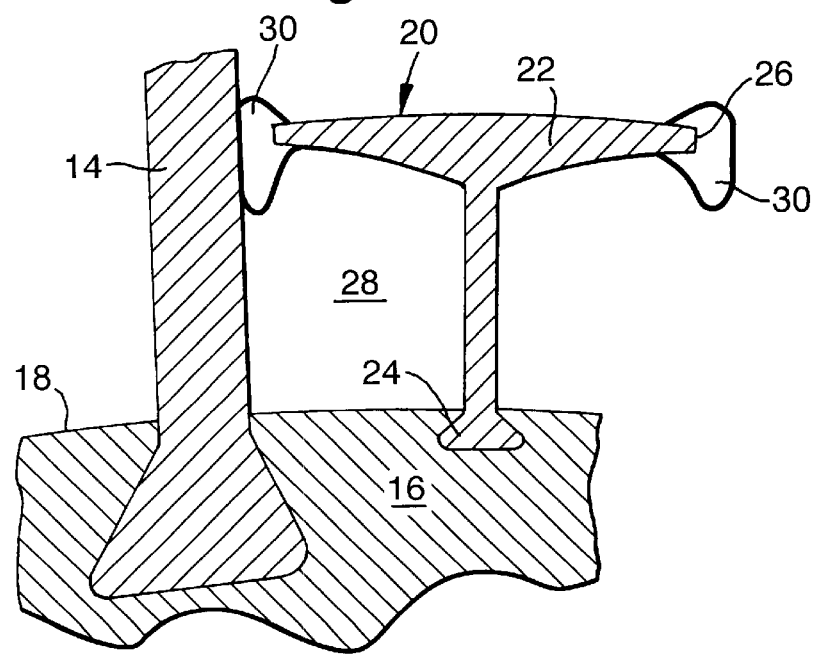
FIG. 3 is an enlarged view of part of the rotor shown in FIG. 2 incorporating a rotor seal in accordance with one embodiment of the present invention.

Each wall member 20, FIG. 3, consists of a platform 22 having a foot 24. The foot 24 extends radially inwardly of the platform 22 and engages in the radially outer face 18 of the disc 16. In the embodiment shown in FIG. 3 the foot 24 has a dovetail cross-section and engages a complementary shaped groove in the outer face 18 of the disc 16. It will however be appreciated that the feet 24 could be attached to the disc by other means such as hooks (not shown).

The platform 22 has axially extending side edges 26 that are in close proximity to the adjacent fan blade 14. The side edges 26 of the platform 22 are curved to follow the curvature of the adjacent fan blades 14.

A void 28 exists between the platform 22 of each wall member 20 and the radially outer face of the disc 18. The void 28 is full of air, which is at a higher static pressure than air above the platform 22 in the blade passages. Seals 30 are provided to bridge the gap between the edge 26 of the platform 22 and the blades 14. The seals 30 prevent air flowing from the void 28 into the blade passage.

Figure 4:
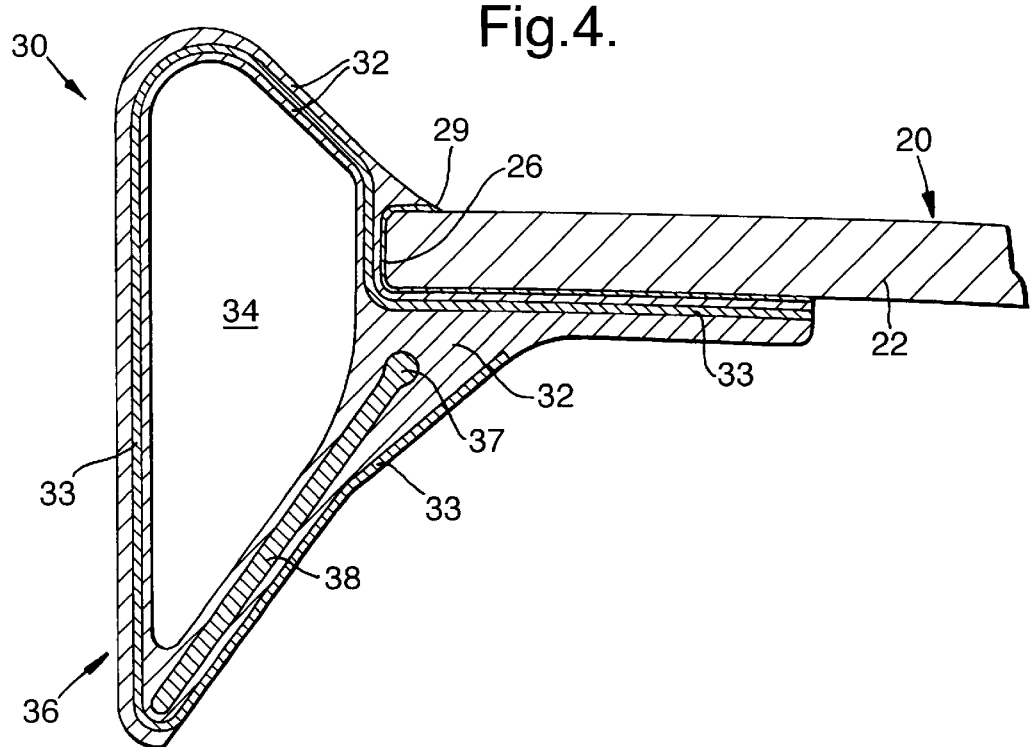
FIG. 4 is sectional view of part of the rotor seal shown in FIG. 3.

Each side edge 26, FIG. 4, of the platform 22 is provided with a seal 30. The seal 30 is moulded in silicone rubber and is bonded along the edge 26 of the platform 22 by an adhesive 29, such as silicone sealant.

The seal 30 consists of rubber bellows 32 which have a cavity 34 therein. The cavity 34 is open at one end adjacent the rear of the rotor 12. In operation, air is pressurized as it passes through the rotor 12. The pressurized air enters the opening at the rear of the cavity 34, fills the cavity 34 and inflates the rubber bellows 32. As the bellows 32 inflate, the seal 30 expands and is urged into abutment with the adjacent blade 14.

Inflation of the rubber bellows 32 by the pressurized air passing through the rotor 12 ensures that the seal 30 expands to fill the gap between the edges 26 of the wall member 20 and the blades 14. A good seal is thus maintained throughout operation of the rotor 12 and prevents the air in the void 28 passing into the blade passage.

It will be appreciated that provided the seal 32 is expandable it can be formed from materials which are not resilient.

Figure 7:
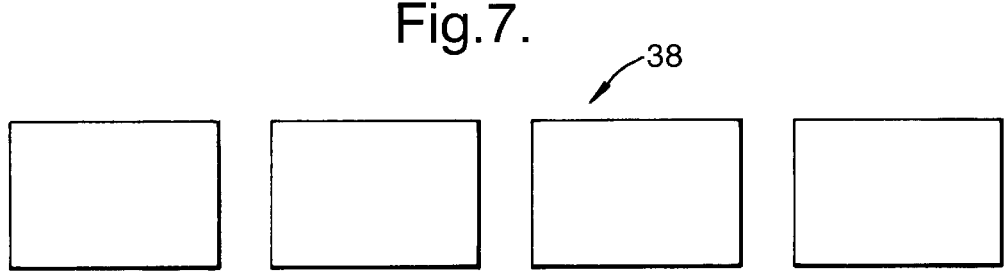
FIGS. 7 and 8 are plan views of different carbon composite reinforcement members for use in a rotor seal in accordance with the present invention.
Figure 8:
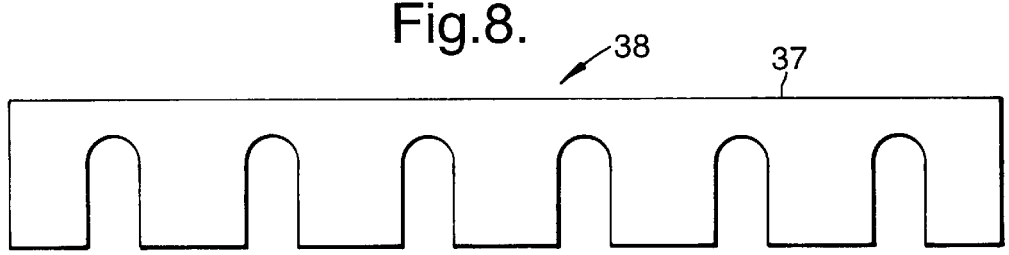

In the embodiments shown the seals 30 have a flange portion 36 which is inclined radially inward and has a rigid reinforcement arm 38 embedded therein. The reinforcement arm 38 is made of carbon composite and has slots cut into it which give flexibility so that the seal 30 can accommodate the curvature of the surfaces of the blade 14. The slots in the reinforcement arm 38 may run from one edge to the other, separating the carbon composite into separate panels as shown in FIG. 7. Alternatively the slots may run only part way up the reinforcement arm 38 to give a comb structure as shown in FIG. 8 which has a continuous strip of carbon composite 37 along one edge.

The edge 37 of the carbon composite reinforcement arm 38 is positioned adjacent the edge 26 of platform 22 and forms a hinge about which the flange portion 36 of the seal 30 can rotate. During operation of the rotor 12 centrifugal forces act on the flange portion 36 of the seal 30 and urge it radially outward. The flange portion 36 rotates about the hinge under the centrifugal forces. The hinge effect of the reinforcement arm 38 allows the seal 30 to be effective in a wide range of gaps between the edge 26 of the platform 22 and the adjacent blade 14.

Figure 5:
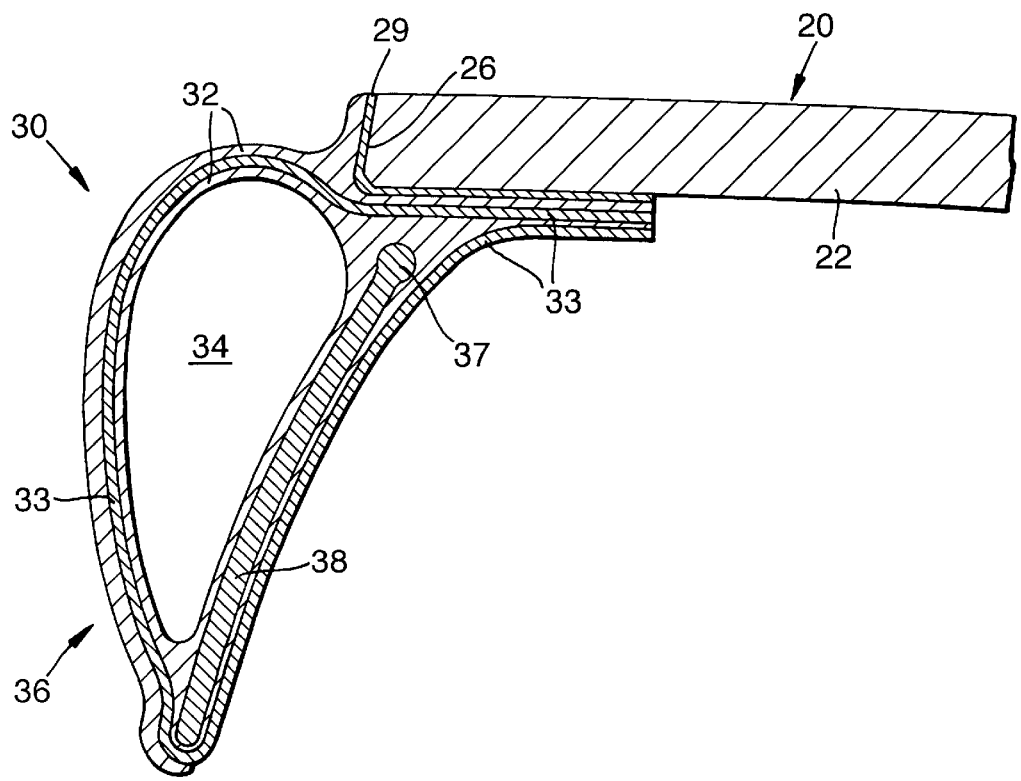
FIG. 5 is a sectional view of a rotor seal in accordance with a second embodiment of a rotor seal in accordance with the present invention.
Figure 6:
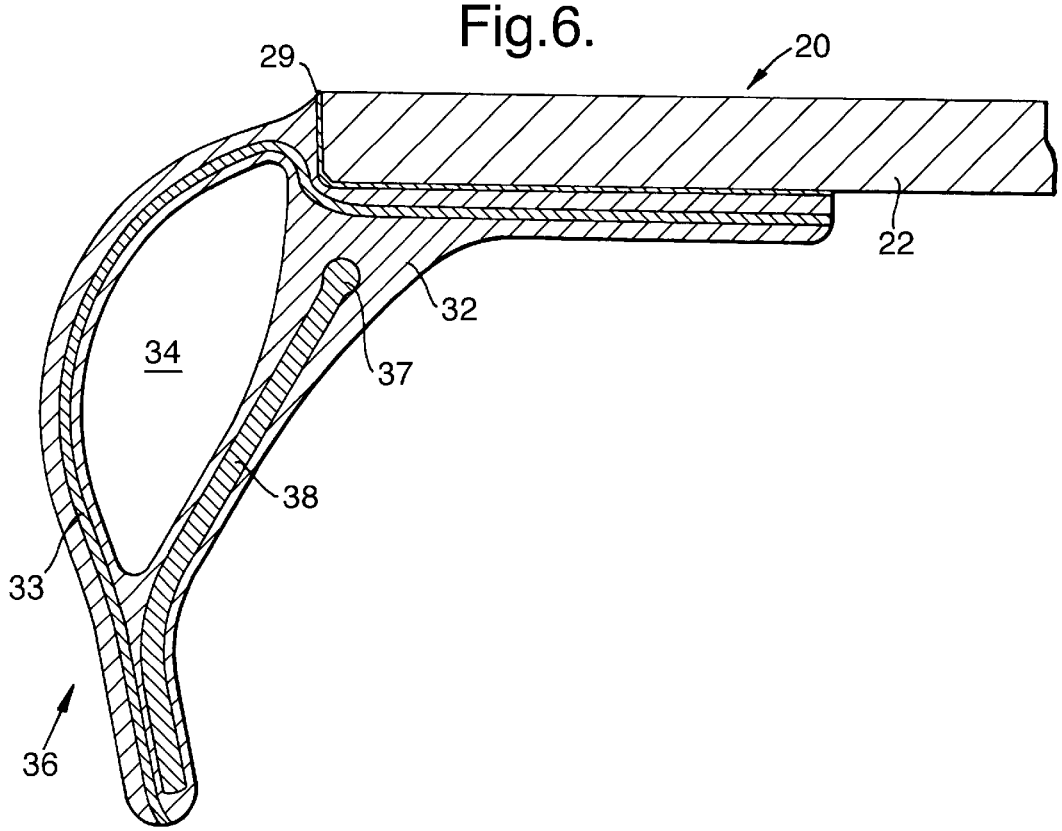
FIG. 6 is a sectional view of a rotor seal in accordance with a third embodiment of the present invention.

In the preferred embodiments of the present invention the rubber bellows 32 is reinforced with a fabric 33, such as polyester. In FIGS. 4 and 5 the reinforcing fabric 33 extends around the free end and up the back of the rigid reinforcement arm 38 for added strength. Whereas in FIG. 6 the reinforcing fabric 33 terminates at the free end of the reinforcing arm 38 to give a lighter construction.

In the embodiments of the present invention shown in FIGS. 3 and 4 the rubber bellows 32 extends above and below the platform 22 of the wall member 20. This enhances the effectiveness of the seal 30 by substantially eliminating any voids between the seal 30 and the adjacent blade 14. Air cannot re-circulate in the seal voids thus preventing any disruption to the airflow in the blade passage.

The portion of the seal 30 which occupies the region above the platform 26 and the adjacent blade 14 gives an additional aerodynamic advantage.

One skilled in the art will appreciate that a seal 30 in accordance with the present may be inflated by fluids other than air and may have application other than in the rotor 12 of a gas turbine engine.

We claim:

1. A rotor for a gas turbine engine comprising a rotor disc having a radially outer face on which a plurality of radially extending blades are mounted, separate wall members being provided to bridge the space between adjacent blades to define an inner wall of a flow annulus through the rotor, each of the wall members being adapted for attachment to the radially outer face of the disc and having opposing side faces which are spaced circumferentially from the adjacent blades, seals being mounted adjacent the opposing side faces of the wall members, at least one of the seals is expandable and has a cavity therein, whereby in operation a fluid fills the cavity to inflate the seal.

2. A rotor for a gas turbine engine as claimed in claim 1 in which the seal has a flange portion which is inclined radially inwards, whereby in operation the flange portion is deflected radially outward.

3. A rotor for a gas turbine engine as claimed in claim 2 in which the cavity is located in the flange portion of the seal.

4. A rotor for a gas turbine engine as claimed in claim 1 in which an opening is provided so that a fluid can flow into the cavity to inflate the seal.

5. A rotor for a gas turbine engine as claimed in claim 4 in which the fluid passes from the rotor into the cavity to inflate the seal.

6. A rotor for a gas turbine engine as claimed in claim 5 characterised in that the fluid in the rotor and which inflates the seal is air.

7. A rotor for a gas turbine engine as claimed in claim 1 in which a bellows defines the cavity.

8. A rotor for a gas turbine engine as claimed in claim 7 in which the bellows is formed from a resilient material.

9. A rotor for a gas turbine engine as claimed in claim 1 in which the seal is reinforced.

10. A rotor for a gas turbine engine as claimed in claim 9 in which the seal is reinforced by a single strip of carbon composite.

11. A rotor for a gas turbine engine as claimed in claim 10 in which the strip of carbon composite has slots therein to render it sufficiently flexible to accommodate the curvature of we adjacent blades.

12. A rotor for a gas turbine engine according to claim 10, wherein the seal is provided with a fabric reinforcement.

13. A rotor for a gas turbine engine as claimed in claim 12 in which the fabric extends around the carbon composite.

14. A rotor for a gas turbine engine according to claim 12, wherein the seal is reinforced with polyester.

15. A rotor for a gas turbine engine as claimed in claim 9 in which the seal is reinforced by a plurality of discrete carbon composite panels.

16. A rotor for a gas turbine engine as claimed in claim 9 in which the seal is provided with fabric reinforcement.

17. A rotor for a gas turbine engine as claimed in claim 16 in which the seal is reinforced with polyester.

18. A seal for reducing the gap between adjacent members which are arranged circumferentially in a rotor, the seal having a flange portion which is inclined radially, inwards, a cavity is located in the flange portion of the seal, whereby in operation the flange portion is deflected radially outwards and the cavity fills with a fluid to inflate the seal.

19. A seal as claimed in claim 18 in which an opening is provided so that a fluid can flow into the cavity to inflate the seal.

20. A seal as claimed in claim 18 in which the fluid passes from the rotor into the cavity to inflate the seal.

21. A seal as claimed in claim 18 in which the fluid that inflates the seal is air.

22. A seal as claimed in claim 18 in which a bellows defines the cavity.

23. A seal as claimed in claim 22 in which the bellows is formed from a resilient material.

24. A seal as claimed in claim 18 in which the seal is reinforced.

25. A seal as claimed in claim 24 in which it is reinforced by a strip of carbon composite.

26. A seal as claimed in claim 25 in which the strip of carbon composite has slots therein to render it sufficiently flexible to accommodate the curvature of the adjacent member.

27. A seal according to claim 25, in which the seal is reinforced with a fabric reinforcement.

28. A seal according to claim 27, wherein the seal is reinforced with polyester.

29. A seal as claimed in claim 27 in which the fabric extends around the carbon composite.

30. A seal as claimed in claim 20 in which the seal is reinforced by a plurality of discrete carbon composite panels.

31. A seal as claimed in claim 24 in which the seal is reinforced with fabric reinforcement.

32. A seal as claimed in claim 31 in which the seal is reinforced with polyester.

33. A seal as claimed in claim 18 in which the seal reduces the gap between alternate wall members and adjacent blades arranged circumferentially in a rotor.

34. A rotor for a gas turbine engine incorporating a seal as claimed in claim 18.

* * * * *